(12) United States Patent
Takeda et al.

(10) Patent No.: US 11,327,309 B2
(45) Date of Patent: May 10, 2022

(54) VIRTUAL IMAGE DISPLAY APPARATUS

(71) Applicant: SEIKO EPSON CORPORATION, Tokyo (JP)

(72) Inventors: Takashi Takeda, Suwa (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 209 days.

(21) Appl. No.: 16/524,241

(22) Filed: Jul. 29, 2019

(65) Prior Publication Data

US 2020/0033606 A1 Jan. 30, 2020

(30) Foreign Application Priority Data

Jul. 30, 2018 (JP) .............................. JP2018-142209

(51) Int. Cl.
*G02B 27/01* (2006.01)
*G02B 17/08* (2006.01)

(52) U.S. Cl.
CPC ....... *G02B 27/0172* (2013.01); *G02B 17/082* (2013.01); *G02B 17/086* (2013.01);
(Continued)

(58) Field of Classification Search
CPC .... G02B 17/086; G02B 17/08; G02B 17/082; G02B 17/0836; G02B 17/084; G02B 17/0844; G02B 17/0848; G02B 17/0856; G02B 2027/011; G02B 2027/0123; G02B 2027/0145; G02B 2027/013; G02B 2027/0178; G02B 2027/0134; G02B 2027/0132; G02B 2027/0143; G02B 2027/0152; G02B 2027/0169; G02B 2027/0107; G02B 27/0176; G02B 27/0172; G02B 27/01; G02B 27/0101; G02B 27/017; G02B 27/0178; G02B 27/04; G02B 23/125
(Continued)

(56) References Cited

U.S. PATENT DOCUMENTS 4,448,504 A * 5/1984 Altman ................... G09F 9/405
353/102
6,046,857 A 4/2000 Morishima
(Continued)

FOREIGN PATENT DOCUMENTS

JP H09-189880 A 7/1997

*Primary Examiner* — Travis S Fissel
(74) *Attorney, Agent, or Firm* — Oliff PLC

(57) ABSTRACT

A virtual image display apparatus includes a display device (image forming unit), a lens configured to refract imaging light from the display device, a first mirror member configured to reflect imaging light that passed through the lens, a second mirror member being a refractive reflective optical member configured to reflect the imaging light reflected by the first mirror member, and a third mirror member of a transmissive type configured to reflect the imaging light reflected by the second mirror member toward a position of an exit pupil. The refractive reflective optical member includes, across a refractive member, a refractive surface and a mirror surface. The lens and the refractive reflective optical member are integrated as a composite member.

13 Claims, 9 Drawing Sheets

(52) U.S. Cl.
CPC .... *G02B 17/0856* (2013.01); *G02B 2027/011* (2013.01); *G02B 2027/013* (2013.01); *G02B 2027/0123* (2013.01); *G02B 2027/0145* (2013.01); *G02B 2027/0178* (2013.01)

(58) Field of Classification Search
USPC .......................................... 359/629–633, 13
See application file for complete search history.

(56) References Cited

U.S. PATENT DOCUMENTS

| | | | | |
|---|---|---|---|---|
| 6,493,146 | B2* | 12/2002 | Inoguchi | G02B 27/0172 |
| | | | | 359/630 |
| 7,081,999 | B2* | 7/2006 | Yamazaki | G02B 27/0172 |
| | | | | 359/630 |
| 7,352,521 | B2* | 4/2008 | Matsunaga | G02B 13/06 |
| | | | | 353/28 |
| 2002/0044361 | A1* | 4/2002 | Scott | G02B 27/0172 |
| | | | | 359/630 |
| 2002/0167463 | A1* | 11/2002 | Inoguchi | G02B 27/0172 |
| | | | | 345/8 |
| 2008/0055193 | A1* | 3/2008 | Tsuyuki | G02B 27/46 |
| | | | | 345/7 |

* cited by examiner

VIRTUAL IMAGE DISPLAY APPARATUS

The present application is based on and claims priority from JP-A-2018-142209, filed Jul. 30, 2018, the disclosure of which is hereby incorporated by reference herein in its entirety.

BACKGROUND

1. Technical Field

The present disclosure relates to a head-mounted display including a mirror and the other virtual image display apparatus, and more particularly, to a virtual image display apparatus that is configured to provide see-through view.

2. Related Art

In recent years, various types of a virtual image display apparatus in which imaging light from a display element is guided to a pupil of an observer by an optical element such as a mirror and a light guide are proposed as a virtual image display apparatus, which enables formation and observation of a virtual image, like a head-mounted display.

An optical system described in JP-A-9-189880 is constituted by four eccentric curved mirrors, a first eccentric curved mirror has a rotating elliptic surface or an aspheric surface based on a rotating elliptic surface, and a second eccentric curved mirror has a hyperboloid or an aspheric surface based on a hyperboloid. Weight reduction is more easily achieved by constituting the optical system with the eccentric curved mirrors than when a light guide is used.

However, when the optical system is constituted by only the eccentric curved mirrors, optical surfaces, i.e., reflecting surfaces cannot be brought close to each other to an extent of approximately the size of itself or less. Thus, correction of an aberration is more likely to be insufficient, and resolution and the other optical performance cannot be secured, which does not facilitate increasing an angle of view.

SUMMARY

A virtual image display apparatus in one aspect of the present disclosure includes an image forming unit, a lens configured to refract imaging light from the image forming unit, a first mirror member configured to reflect imaging light that passed through the lens, a second mirror member being a refractive reflective optical member including, across a refractive member, a refractive surface and a mirror surface, and configured to reflect the imaging light reflected by the first mirror member, and a third mirror member of a transmissive type configured to reflect the imaging light reflected by the second mirror member toward a position of an exit pupil. The lens and the refractive reflective optical member are integrated as a composite member.

DESCRIPTION OF EXEMPLARY EMBODIMENTS

Exemplary Embodiment

Next, a virtual image display apparatus of one exemplary embodiment according to the present disclosure will be described with reference to drawings.

Figure 1:
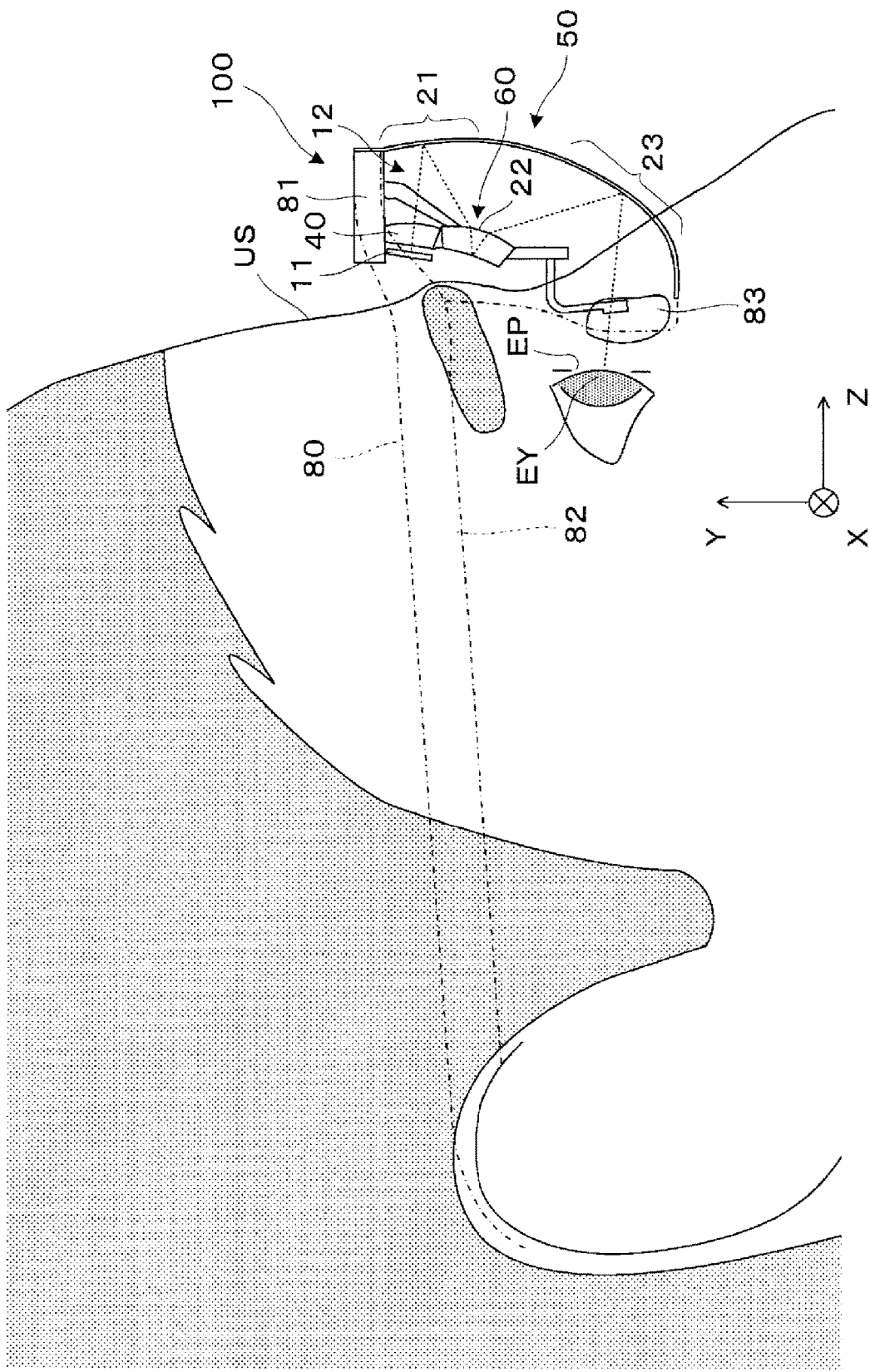
FIG. 1 is a side cross-sectional view illustrating a virtual image display apparatus according to an exemplary embodiment.
Figure 2:
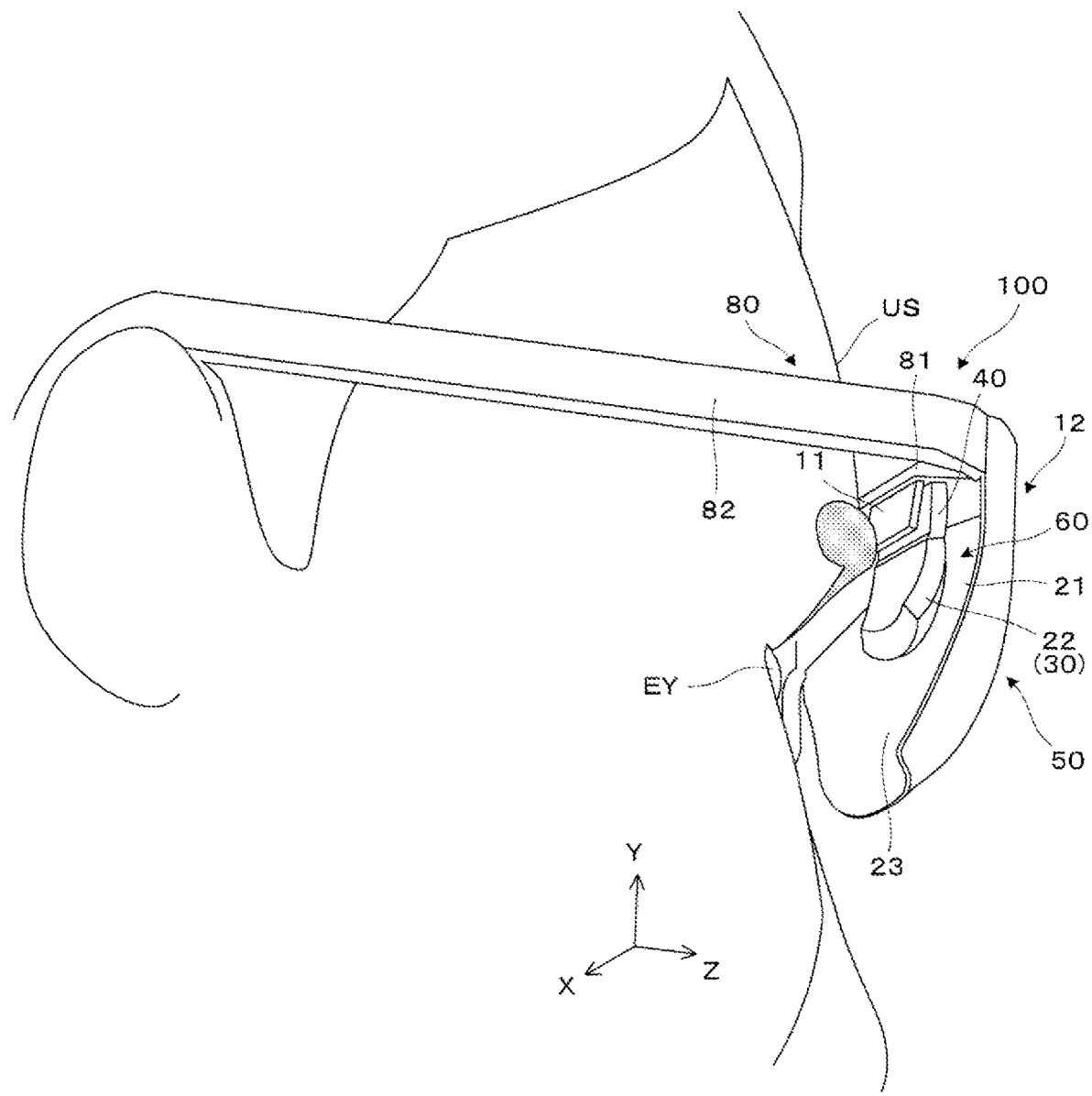
FIG. 2 is a perspective view illustrating the virtual image display apparatus according to the exemplary embodiment when viewed from diagonally below.
Figure 3:
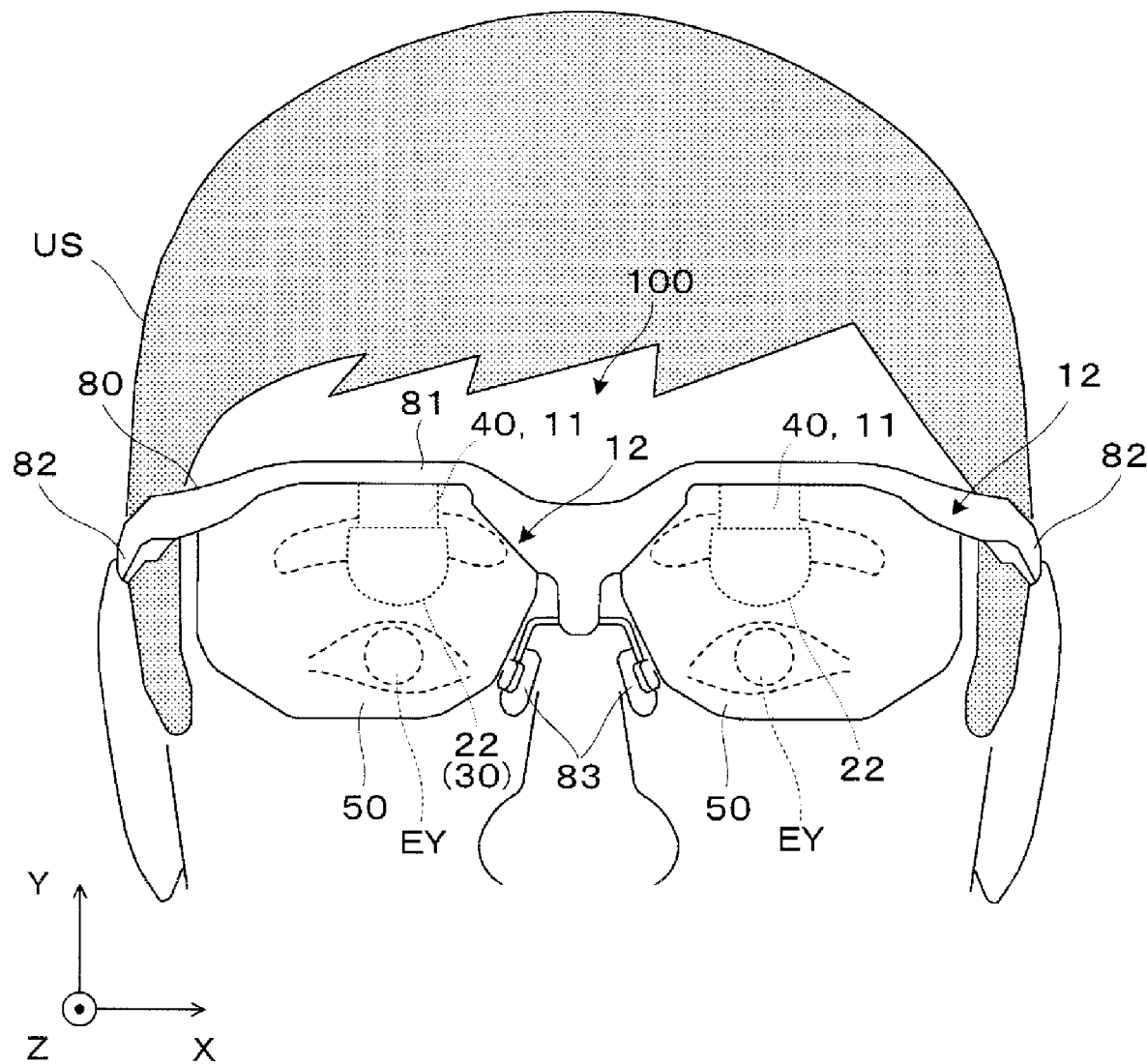
FIG. 3 is a front view illustrating the virtual image display apparatus according to the exemplary embodiment.

In FIGS. 1 to 3, X, Y and Z are an orthogonal coordinate system, an X direction corresponds to a lateral direction in which both eyes of an observer US wearing a virtual image display apparatus 100 are aligned, a Y direction corresponds to an upward direction orthogonal to the lateral direction in which both eyes of the observer US are aligned, and a Z direction corresponds to a front direction of the observer US or a front surface direction.

The illustrated virtual image display apparatus 100 is a head-mounted display, and causes the observer US to recognize a video as a virtual image. The virtual image display apparatus 100 includes a display device 11 and a projection optical system 12. The projection optical system 12 includes a lens 40, a first mirror member 21, a second mirror member 22, and a third mirror member 23. Herein, the second mirror member 22 is a refractive reflective optical member 30 obtained by combining a refractive surface 22e and a mirror surface 22r. The display device 11, the lens 40, and the second mirror member 22 are integrally fixed and are supported by a body member 81 of a frame 80 on an upper portion. In particular, the lens 40 and the second mirror member 22 are integrated as a composite member 60. Further, the first mirror member 21 and the third mirror member 23 are connected to each other and constitute an integral appearance member 50, and are supported by the body member 81 of the frame 80 on the upper portion and a side portion. The appearance member 50 is disposed in a state of being positioned on an outer side or an external side of the display device 11, the lens 40, and the second mirror member 22 with respect to the display device 11 and the like. The appearance member 50 has an outline having a shape of eyeglasses, and has a curved shape being convex outward over eyes of the observer US. FIG. 1 illustrates only the virtual image display apparatus 100 for the right eye, but the virtual image display apparatus 100 having an appearance like eyeglasses as a whole can be obtained by combining a virtual image display apparatus for the left eye having a similar structure with the virtual image display apparatus 100 for the right eye. Note that, one of portions for the right eye and the left eye may be omitted from the virtual image display apparatuses for both eyes, and, in this case, a one-eye head-mounted display is obtained. Note that, in describing an overview of an optical path, imaging light GL emitted from the display device 11 passes through the lens 40, is reflected by the first mirror member 21, and is incident on the second mirror member 22. The imaging light GL incident on the second mirror member 22 is refracted and also reflected by the second mirror member 22 and emitted to the outside of the second mirror member 22. The imaging light GL emitted from the second mirror member 22 is reflected by the third mirror member 23 of the transmissive type and incident on a position of an exit pupil EP.

The frame 80 has a structure similar to that of eyeglasses, and includes a sidepiece portion 82 connected to a lateral end portion of the body member 81, and a nose pad 83 at a tip of a metal fitting extending from the center of the body member 81.

Figure 4:
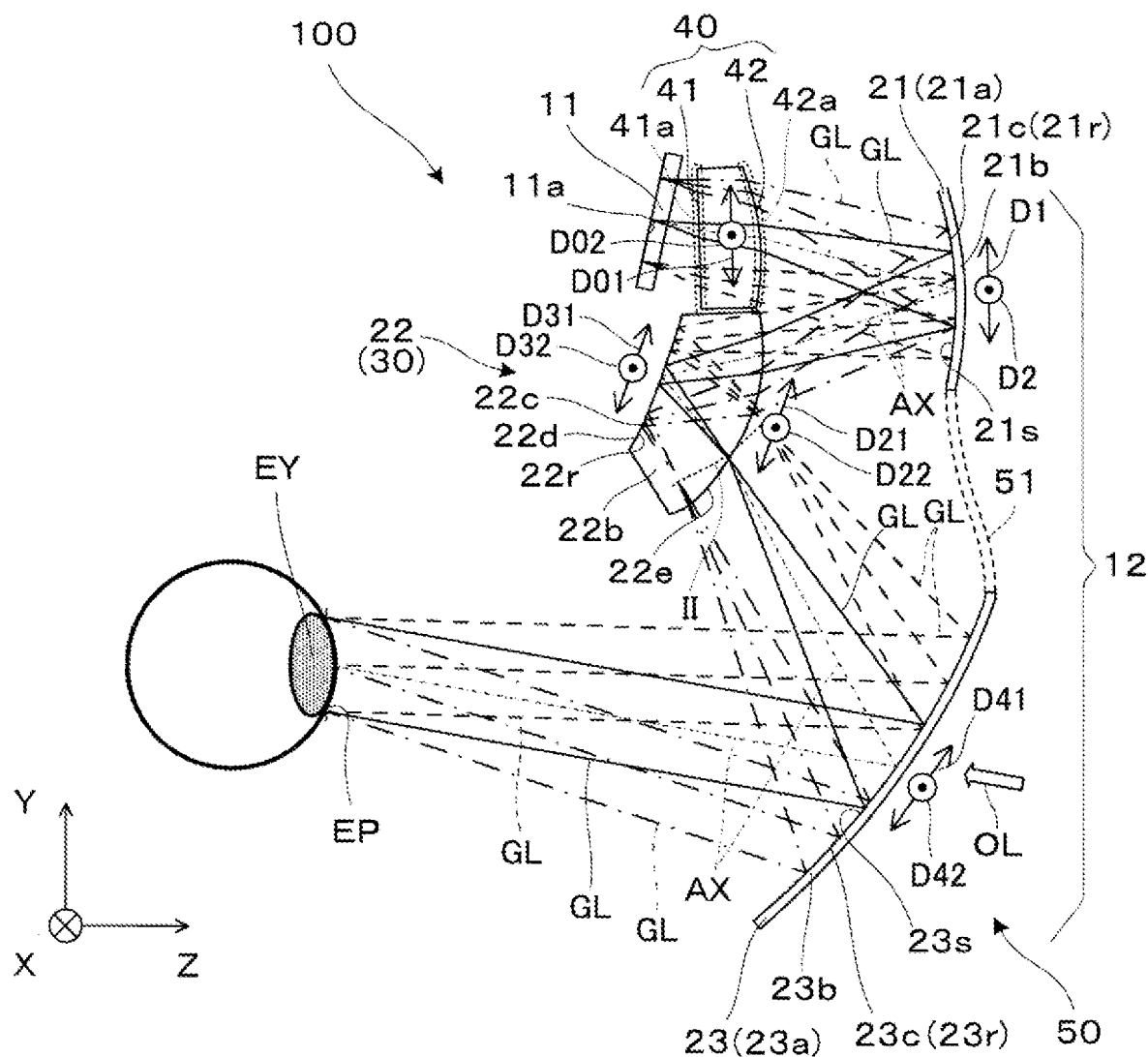
FIG. 4 is a side cross-sectional view illustrating an optical structure and the like of the virtual image display apparatus according to the exemplary embodiment.
Figure 5:
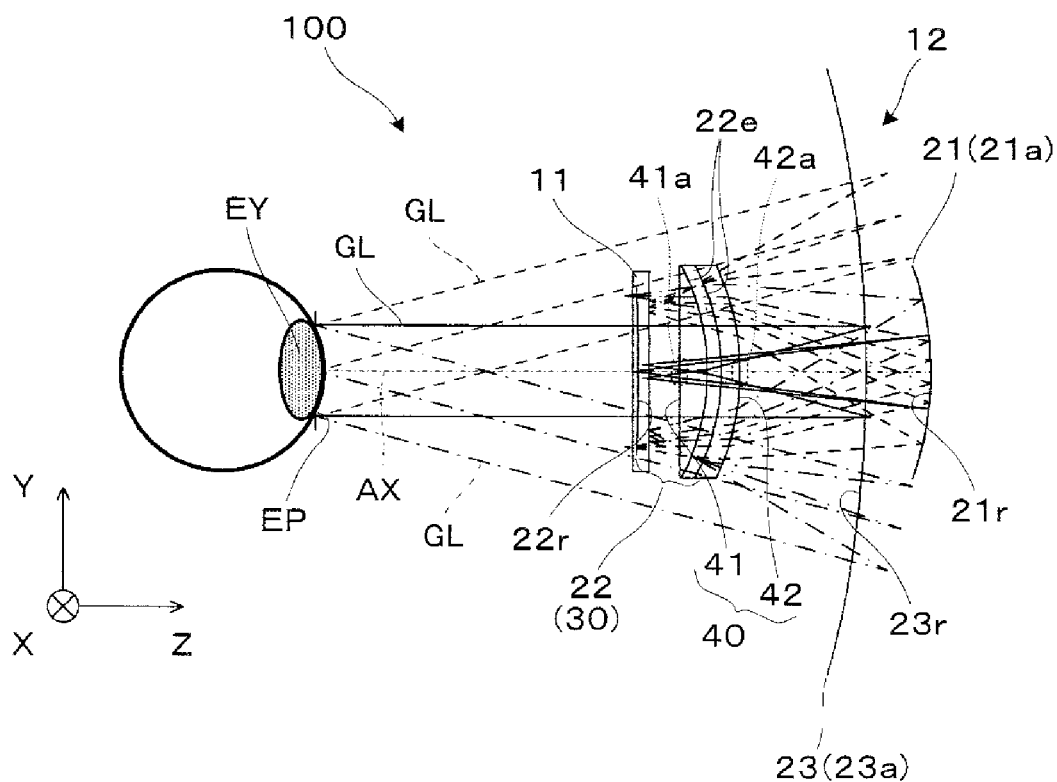
FIG. 5 is a plan view illustrating an optical structure and the like of a virtual image display apparatus according to the exemplary embodiment.

With reference to FIGS. 4 and 5, the display device 11 is an image forming unit, and is disposed on the upper side or the +Y side of the projection optical system 12 corresponding to a head side of the observer US. The display device (image forming unit) 11 is a self-luminous type display element typified by, for example, an organic electro-luminescence (organic EL), an inorganic EL, an LED array, an organic LED, a laser array, a quantum dot emission type element, and the like, and forms a still image or a moving image in color on a two-dimensional display surface 11a. The display device 11 is driven by a drive control circuit (not illustrated) and performs a display operation. When an organic EL display is used as the display device 11, the display device 11 is configured to include an organic EL control unit. When a quantum dot display is used as the display device 11, the display device 11 is configured to emit green or red color by causing light of a blue light emitting diode (LED) to pass through a quantum dot film. The display device 11 is not limited to a self-luminous display element, and may be constituted by an LCD or the other light modulating element, and may form an image by illuminating the light modulating element with a light source such as a backlight. As the display device 11, a liquid crystal on silicon (LCOS, LCoS is a trade name), a digital micromirror device, and the like may be used instead of the LCD.

Figure 6:
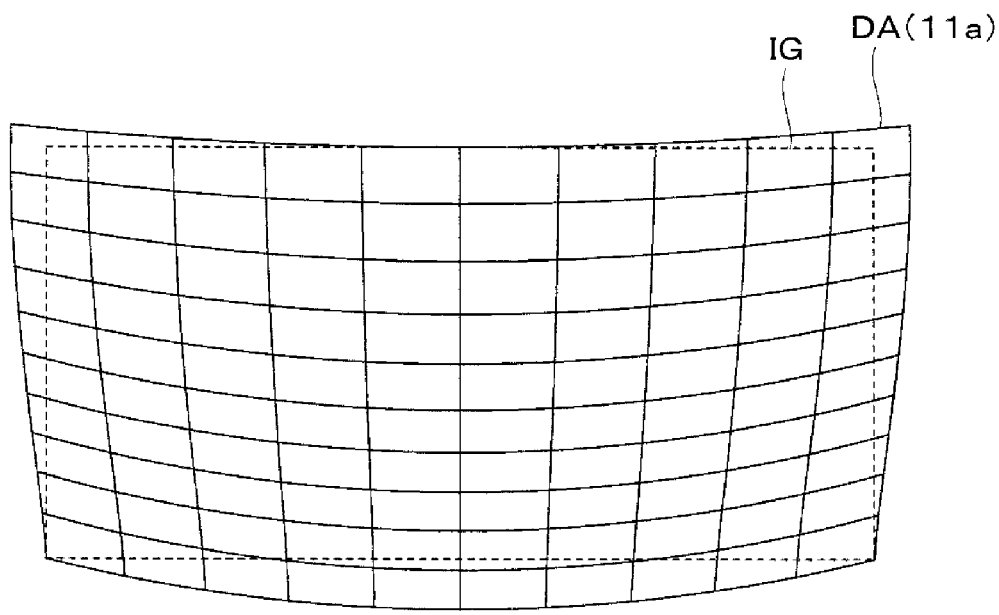
FIG. 6 is a diagram illustrating a compulsory distortion of a display image formed on a display device.

As illustrated in FIG. 6, a display image DA formed on the display surface 11a of the display device 11 is a modification image with a trapezoidal distortion as viewed from a distortion of a virtual grid. As described later, since the projection optical system 12 is an eccentric optical system, it is not easy to remove all distortion such as the trapezoidal distortion. Thus, even when the distortion remains in the projection optical system 12, by previously providing the display image DA formed on the display surface 11a with a distortion, a pixel array of a projected image IG of a virtual image observed in a position of the exit pupil EP via the projection optical system 12 can have a grid pattern, and an outline can be rectangular. As a result, the observer US can observe the projection image IG with less distortion, which facilitates correction of the other aberration in the projection optical system 12. The display image (modification image) DA formed on the display surface 11a may be a display image in which a compulsory distortion is formed by image processing. When the display surface 11a is rectangular, a margin is formed by forming a compulsory distortion, but additional information may be displayed in such a margin. The display image (modification image) DA formed on the display surface 11a is not limited to a display image in which a compulsory distortion is formed by image processing, and, for example, an array of display pixels formed on the display surface 11a may correspond to a compulsory distortion. In this case, image processing for correcting the distortion is not needed. Furthermore, the display surface 11a may be curved to correct an aberration.

Referring back to FIGS. 4 and 5, the projection optical system 12 is a non-coaxial optical system or an eccentric optical system. An eccentric direction of the projection optical system 12 is defined by the arrangement of the first mirror member 21, the second mirror member 22, and the like. Specifically, the lens 40, the first mirror member 21, the second mirror member 22, and the third mirror member 23 have the eccentric direction set within a YZ plane. In other words, an optical axis AX passing through the lens 40, the first mirror member 21, the second mirror member 22, and the third mirror member 23 is disposed along a plane that intersects the lateral direction in which a pair of pupils EY of an observer are aligned, i.e., the X direction and extends in a substantially vertical direction, and more specifically, is disposed along the YZ plane that is orthogonal to the X direction and extends in the vertical direction. The optical axis AX is disposed along the vertical YZ plane, and thus an angle of view in the lateral direction is easily increased. When a plane including the optical axis AX is inclined in a clockwise direction or a counterclockwise direction (i.e., left or right) around the Z axis by a few 10°, an influence on the angle of view is not greatly increased with the optical axis AX extending in the substantially vertical direction. Further, the lens 40 is disposed on the upper side or the +Y side of the first mirror member 21 corresponding to the head side of the observer US, the first mirror member 21 is disposed on the upper side or the +Y side of the second mirror member 22 corresponding to the head side of the observer US, and the second mirror member 22 is disposed on the upper side or the +Y side of the third mirror member 23 corresponding to the head side of the observer US. Herein, the upper side or the +Y side is considered, with an intersection or a point of contact of each of the mirror members 21, 22, and 23 and the optical axis AX being a reference.

Figure 7:
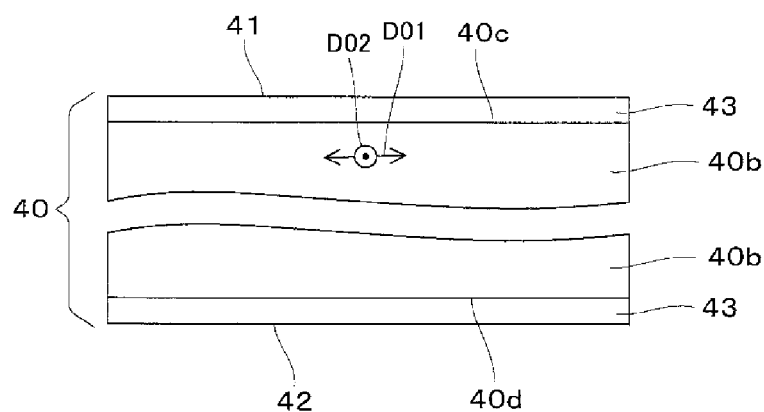
FIG. 7 is an enlarged cross-sectional view illustrating a structure of a refractive surface and the like of a lens.

The lens 40 includes a pair of lens surfaces 41 and 42, and refracts the imaging light GL from the display device 11. The lens 40 has a structure in which an antireflective coating 43 is formed on surfaces 40c and 40d of a base material 40b (see FIG. 7). Both of the lens surfaces 41 and 42 are, for example, a free curved surface, but may also be an aspheric surface. Both of the lens surfaces 41 and 42 are asymmetric across the optical axis AX with respect to a first direction D01 corresponding to the eccentric direction in the YZ plane, and are symmetric across the optical axis AX with respect to a second direction D02 or the X direction orthogonal to the first direction D01. Herein, the asymmetry in the first vertical direction D01 appears as inclinations of the pair of lens surfaces 41 and 42 and the like, that is, a difference or a bias in intersection angles of the pair of lens surfaces 41 and 42 with respect to a portion of the optical axis AX within the lens 40. On the other hand, the symmetry in the second horizontal direction D02 appears as a match of intersection angles of the pair of lens surfaces 41 and 42 with respect to a portion of the optical axis AX within the lens 40. In the illustrated case, the lens surface 41 is relatively greatly inclined with respect to the optical axis AX, and the lens surface 42 is also relatively greatly inclined with respect to the optical axis AX. The lens 40 is made of resin such as polycarbonate and a cycloolefin-based polymer, for example, but may also be made of glass. An antireflective coating may also be formed on the lens surfaces 41 and 42. The refractive member 22b may be formed of a material having an Abbe number of greater than or equal to 50 in terms of suppressing occurrence of chromatic aberrations.

In the lens 40 described above, an aberration reduction can be achieved by setting the lens surfaces 41 and 42 to be free curved surfaces or aspheric surfaces, and, particularly when the free curved surfaces are used, an aberration of the projection optical system 12 being a non-coaxial optical system or an eccentric optical system can be easily reduced. Note that the free curved surface is a surface without an axis of rotational symmetry, and various polynomials may be used as a surface function of the free curved surface. In addition, the aspheric surface is a surface having an axis of rotational symmetry, but is a paraboloid or a surface other than a spherical surface expressed by a polynomial.

The lens surfaces 41 and 42 of the lens 40 include a pair of surface regions 41a and 42a that are inclined to each other in a YZ cross section in the first direction D01 passing through the optical axis AX. Note that one of the surface regions 41a and 42a can be orthogonal to the optical axis AX, but both may be inclined with respect to the optical axis AX. The lens 40 can have an action like a prism having a wedge angle in the first direction D01 in the entirety including the surface regions 41a and 42a, and can correct a trapezoidal distortion generated in the first mirror member 21, the second mirror member 22, and the like. In other words, since the projection optical system 12 is an eccentric optical system, a warped distortion such as a trapezoidal distortion is likely to occur, and a trapezoidal distortion generated in the first mirror member 21, the second mirror member 22, and the like can be canceled out by an inverted trapezoidal distortion of the lens 40, and a warped distortion of a projected image being a virtual image can be easily reduced. Note that it is difficult to eliminate a warped distortion with only the lens 40, and it is possible to form a projected image having a warped distortion being further reduced by combining the lens 40 with a technique for previously providing a distortion to the display image DA formed on the display surface 11a as described in FIG. 6.

The lens 40 has different optical power in the first direction D01 and in the second direction D02. Specifically, the optical power in the first direction D01 is smaller than the optical power in the second direction D02. The lens 40 provides telecentricity on the display device (image forming unit) 11 side of the entire system in a cross section in the second direction D02 mainly passing through the optical axis AX. As already described above, since the projection optical system 12 is an eccentric optical system, image formation characteristics tend to be greatly different in the first direction D01 and in the second direction D02. Thus, the mirror members 21, 22, and 23 and the lens 40 having slight optical power make an object-side telecentric system in the vertical direction or the Y direction, and the mirror members 21, 22, and 23 and the lens 40 having great optical power make an object-side telecentric system in the lateral direction or the X direction. As described above, by using the lens 40 to provide an adjustment difference in the vertical and horizontal directions and provide telecentricity, a change in magnification is less likely to occur due to positional shifting in the optical axis direction of the display device 11, which enables a focus adjustment by the display device 11.

Figure 8:
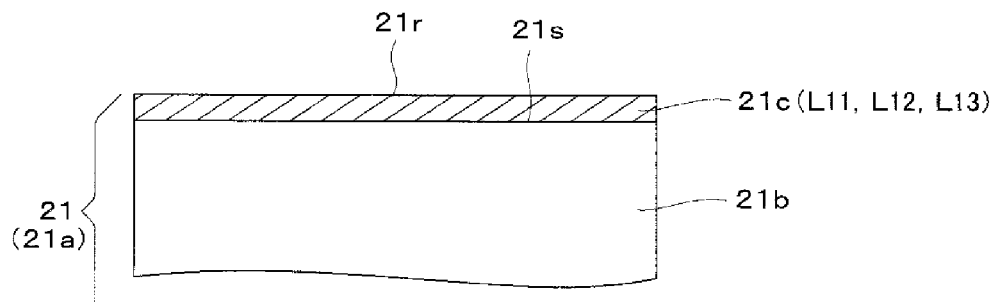
FIG. 8 is an enlarged cross-sectional view illustrating a structure of a reflecting surface and the like of a first mirror member.

The first mirror member 21 is a plate-like component that functions as a concave surface mirror, and reflects the imaging light GL passing through the lens 40. In other words, the first mirror member 21 is a mirror plate 21a having a structure in which a mirror film 21c is formed on one surface 21s of a plate-like body 21b (see FIG. 8). A reflecting surface 21r of the first mirror member 21 is, for example, a free curved surface, and has a shape corresponding to a surface of the mirror film 21c or the surface 21s of the plate-like body 21b. The reflecting surface 21r is not limited to a free curved surface, and may be an aspheric surface. The reflecting surface 21r is asymmetric across the optical axis AX with respect to a first direction D1 corresponding to the eccentric direction in the YZ plane, and is symmetric across the optical axis AX with respect to a second direction D2 or the X direction orthogonal to the first direction D1. The plate-like body 21b of the first mirror member 21 is made of, for example, resin, but may also be made of glass. The mirror film 21c is formed of a single layer film L11 or a multilayer film L12 of metal such as Al and Ag, for example, but may also be a dielectric multilayer film L13. The mirror film 21c may be formed by lamination including a technique such as vapor deposition, but may also be formed by bonding a sheet-shaped reflective film.

Figure 9:
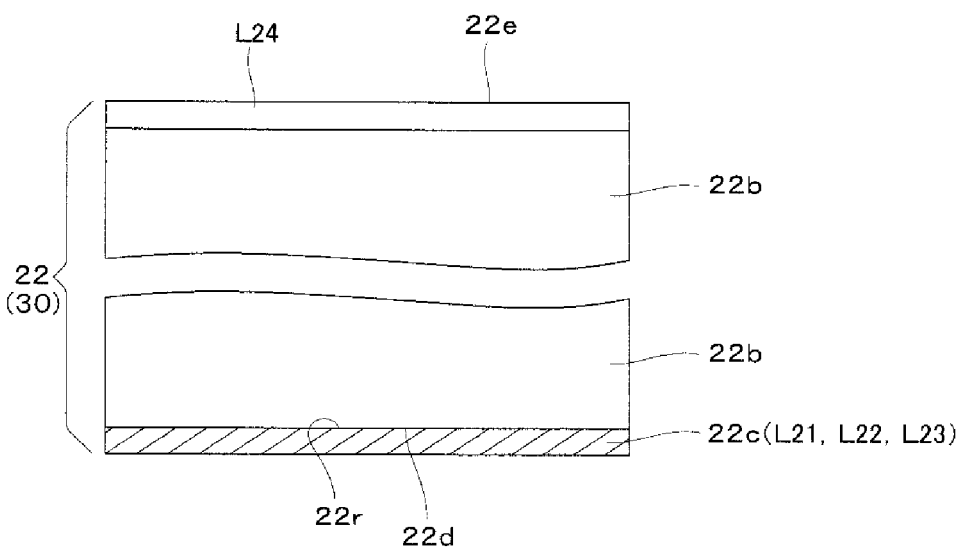
FIG. 9 is an enlarged cross-sectional view illustrating a structure of a reflecting surface and the like of a second mirror member.

The second mirror member 22 is the refractive reflective optical member 30 being a prism-like member that functions as a lens and a mirror, and refracts and also reflects the imaging light GL from the first mirror member 21. The second mirror member 22 or the refractive reflective optical member 30 includes the refractive member 22b including the refractive surface 22e, and a mirror layer 22c that is formed on a non-refractive surface 22d of the refractive member 22b and functions as the mirror surface 22r (see FIG. 9). In other words, the refractive reflective optical member 30 is an optical element provided with the refractive surface 22e and the mirror surface 22r with the refractive member 22b interposed between the refractive surface 22e and the mirror surface 22r. An area of the refractive surface 22e is greater than an area of the mirror surface 22r. The refractive member 22b of the second mirror member 22 is made of, for example, resin such as a cycloolefin-based polymer and polycarbonate, but may also be made of glass. The refractive member 22b may be formed of a material having an Abbe number of greater than or equal to 50 in terms of suppressing occurrence of chromatic aberrations. The mirror layer 22c is formed of a single layer film L21 or a multilayer film L22 of metal such as Al and Ag, for example, but may also be a dielectric multilayer film L23. The mirror film 22c may be formed by lamination, but may also be formed by bonding a sheet-shaped reflective film.

The refractive surface 22e of the second mirror member 22 is, for example, a free curved surface, but may also be an aspheric surface. The refractive surface 22e is a common incidence-emission surface through which the imaging light GL passes before and after reflection by the mirror surface 22r. In other words, a light beam from the first mirror member 21 is refracted by the refractive surface 22e and incident into the second mirror member 22, and, when being reflected by the mirror surface 22r and emitted to the outside of the second mirror member 22, the light beam is refracted again by the refractive surface 22e. The refractive surface 22e is asymmetric across the optical axis AX with respect to a first direction D21 corresponding to the eccentric direction in the YZ plane, and is symmetric across the optical axis AX with respect to a second direction D22 or the X direction orthogonal to the first direction D21. An antireflective coating L24 is formed on the refractive surface 22e.

The mirror surface 22r of the second mirror member 22 is, for example, a free curved surface, and has a shape corresponding to an inner surface of the mirror layer 22c or the non-refractive surface 22d of the refractive member 22b. The mirror surface 22r is not limited to a free curved surface, and may be an aspheric surface. The mirror surface 22r is asymmetric across the optical axis AX with respect to a first direction D31 corresponding to the eccentric direction in the YZ plane, and is symmetric across the optical axis AX with respect to a second direction D32 or the X direction orthogonal to the first direction D31.

Note that the refractive surface 22e of the second mirror member 22 can be divided into two upper and lower regions. In other words, the refractive surface 22e may include an incidence surface on which the imaging light GL from the first mirror member 21 is incident before being reflected by the mirror surface 22r, and an emission surface on which the imaging light GL after being reflected by the mirror surface 22r is incident, and the incidence surface and the emission surface are independent in optical path to each other.

Figure 10:
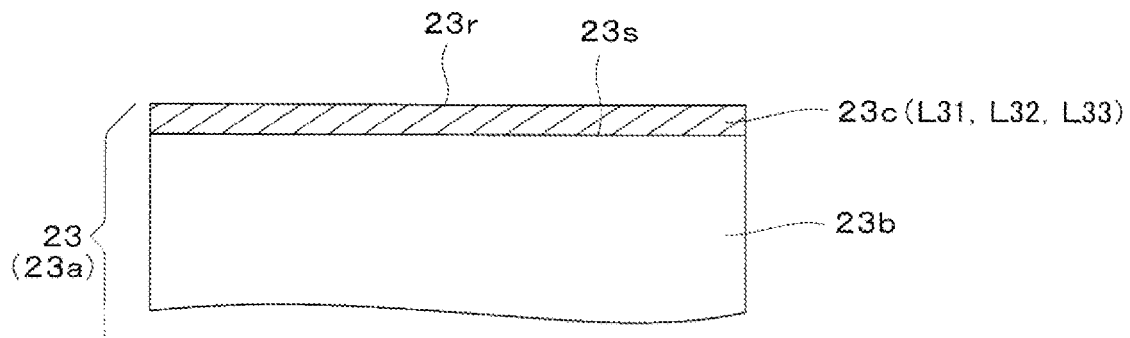
FIG. 10 is an enlarged cross-sectional view illustrating a structure of a reflecting surface and the like of a third mirror member.

The third mirror member 23 is a plate-like component that functions as a concave surface mirror, and reflects the imaging light GL from the second mirror member 22. The third mirror member 23 covers a position of the exit pupil EP in which the pupil EY is located, and also has a concave shape toward the position of the exit pupil EP. The third mirror member 23 is a mirror plate 23a having a structure in which a mirror film 23c is formed on one surface 23s of a plate-like body 23b (see FIG. 10). A reflecting surface 23r of the third mirror member 23 is, for example, a free curved surface, and has a shape corresponding to a surface of the mirror film 23c or the surface 23s of the plate-like body 23b. The reflecting surface 23r is not limited to a free curved surface, and may be an aspheric surface. The reflecting surface 23r is asymmetric across the optical axis AX with respect to a first direction D41 corresponding to the eccentric direction in the YZ plane, and is symmetric across the optical axis AX with respect to a second direction D42 or the X direction orthogonal to the first direction D41.

The third mirror member 23 is a transmissive type reflection element that allows transmission of a part of light upon reflection, and the mirror film 23c of the third mirror member 23 has semi-transmissive property. As a result, external light OL passes through the third mirror member 23, thus see-through view of externals is enabled and a virtual image can be superimposed on an external image. At this time, when the plate-like body 23b has a thickness of less than or equal to approximately few millimeters, a change in magnification of the external image can be suppressed to low. A reflectance of the mirror film 23c with respect to the imaging light GL and the external light OL is set to be greater than or equal to 10% and less than or equal to 50% in a range of an incident angle of the assumed imaging light GL in terms of securing luminance of the imaging light GL and facilitating the observation of an external image by see-through. The plate-like body 23b of the third mirror member 23 is made of, for example, resin, but may also be made of glass. The mirror film 23c is formed of, for example, a dielectric multilayer film L31 including a plurality of dielectric layers having a film thickness adjusted. The mirror film 23c, which may be a single layer film L32 or a multilayer film L33 of metal such as Al and Ag having a film thickness adjusted, can be formed by lamination, but can also be formed by bonding a sheet-shaped reflective film.

A distance between the second mirror member 22 and the position of the exit pupil EP and a distance on the optical path between the third mirror member 23 and the position of the exit pupil EP are set to be greater than or equal to 14 mm along the optical axis AX on the emission side or the Z axis, and a space in which the eyeglasses are disposed is secured. An antireflective coating may be formed on an external side of the third mirror member 23.

As described above, an aberration reduction can be achieved by setting the reflecting surface 21r of the first mirror member 21, the refractive surface 22e of the second mirror member 22, the mirror surface 22r of the second mirror member 22, and the reflecting surface 23r of the third mirror member 23 to be a free curved surface or an aspheric surface, and, particularly when a free curved surface is used, an aberration of the projection optical system 12 being a non-coaxial optical system or an eccentric optical system can be easily reduced.

Figure 11:
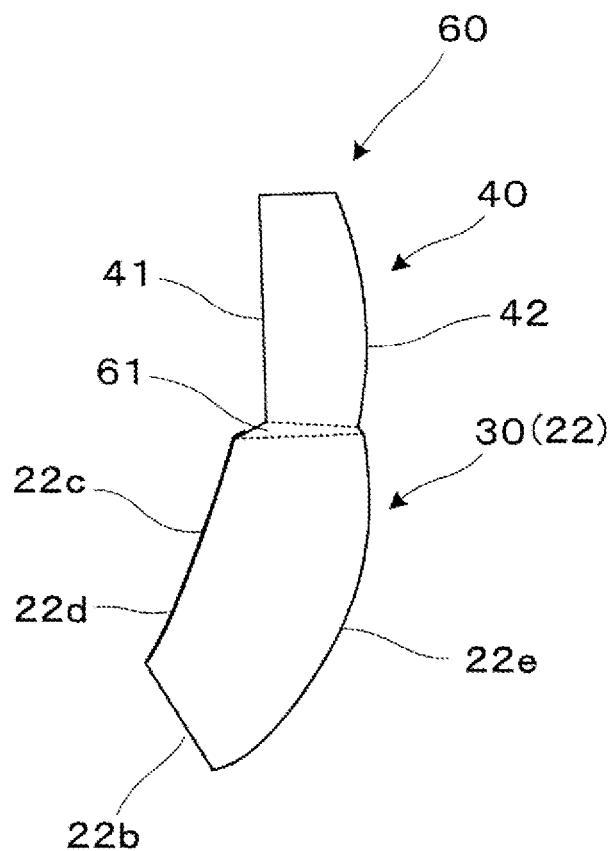
FIG. 11 is a side cross-sectional view illustrating a composite member in which the lens and a refractive reflective optical member are integrated.
Figure 12:
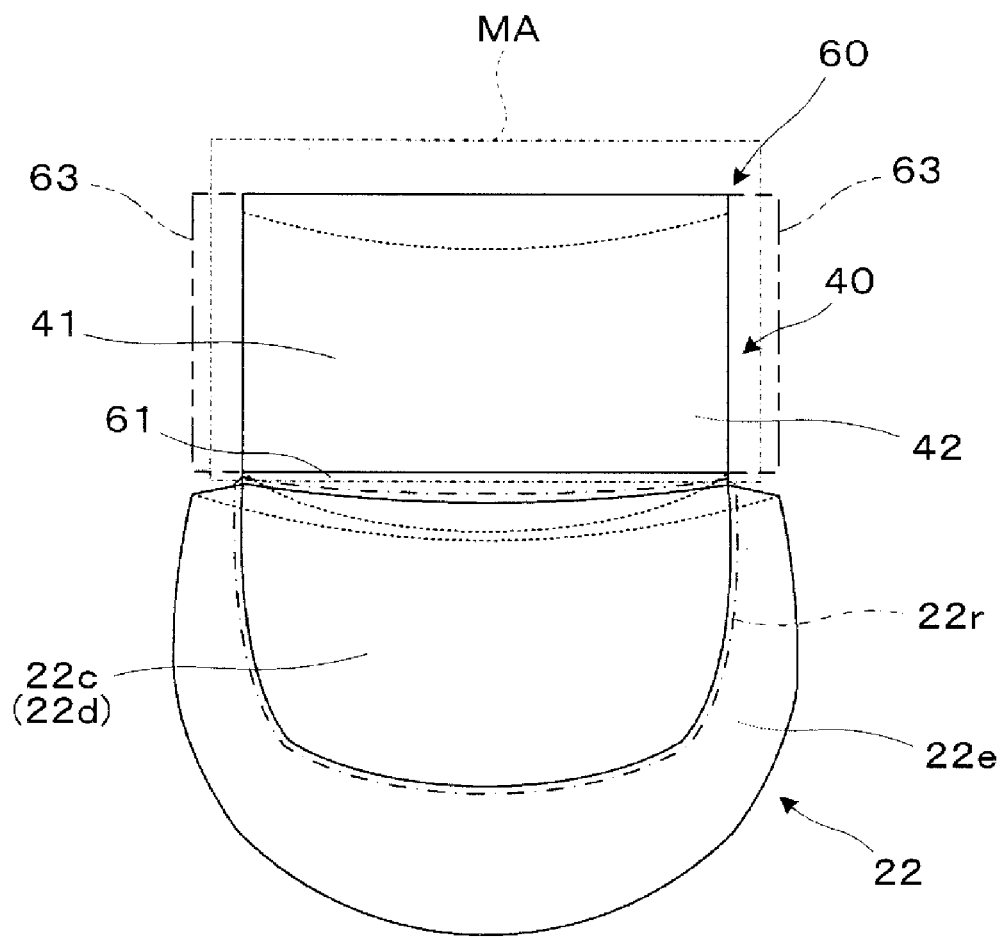
FIG. 12 is a diagram illustrating an inside or an exit pupil side of the composite member.

As illustrated in FIGS. 11 and 12, the lens 40 and the refractive reflective optical member 30 are integrated and constitute the composite member 60. A junction portion 61 having a wedge shape in cross section is interposed between the lens 40 and the refractive reflective optical member 30, and thus the lens 40 and the refractive reflective optical member 30 are positioned with respect to each other and fixed. The lens 40 and the refractive reflective optical member 30 may be formed of the same material. In this case, a refractive index of the lens 40 and a refractive index of the refractive reflective optical member 30 match, and a body portion of the composite member 60 can be integrally formed by injection molding, cast molding, and the like. The lens 40 and the refractive reflective optical member 30 may also be formed of different materials. In this case, a refractive index of the lens 40 and a refractive index of the refractive reflective optical member 30 can be different, and an effect of correcting chromatic aberrations by a combination of the lens 40 and the refractive reflective optical member 30 can be provided. When the lens 40 and the refractive reflective optical member 30 are formed of different materials, a technique such as two-color molding and adhesion can be used. When the lens 40 and the refractive reflective optical member 30 are formed of different materials, the lens 40 and the refractive reflective optical member 30 formed by injection molding or the like in separate steps can be fixed to each other via a fixing member and attached to the body member 81 of the frame 80.

By integrating the lens 40 and the refractive reflective optical member 30, an attachment mechanism to the frame 80 can be simplified, and the lens 40 and the refractive reflective optical member 30 can be easily held. Further, the integration as described above eliminates the need to separately perform optical alignment on the lens 40 and the refractive reflective optical member 30. Furthermore, the projection optical system 12 including the lens 40 and the refractive reflective optical member 30 can be reduced in size. In particular, the lens 40 and the refractive reflective optical member 30 are formed as the integrated composite member 60 from the beginning by integrated molding and the like, or the lens 40 and the refractive reflective optical member 30 are integrated by mutual bonding and are formed as the composite member 60, thus high precision and simplification of alignment of the lens 40 and the refractive reflective optical member 30 can be more easily achieved, and the projection optical system 12 can be more easily reduced in size.

When the mirror layer 22c is formed on the non-refractive surface 22d of the refractive reflective optical member 30, a technique such as vapor deposition, for example, is used. When the mirror layer 22c is formed by vapor deposition, a mask MA disposed as illustrated in FIG. 12 covers the lens surface 41 on the incidence side of the lens 40. Note that an antireflective coating may be formed collectively for the lens surface 42 on the emission side and the refractive surface 22e common to incidence and emission.

In the composite member 60, a support body 63 constituted by a pair of elongating members, for example, can be formed on a part of an outer edge of the lens 40. This support body 63 can be used for positioning and fixing the display device 11 with respect to the lens 40 or the composite member 60.

Referring back to FIGS. 4 and 5, the first mirror member 21 and the third mirror member 23 are connected by a connecting portion 51, and the first mirror member 21 and the third mirror member 23 as a whole form the appearance member 50.

In describing the optical path, the imaging light GL from the display device 11 passes through the lens 40, is incident on the first mirror member 21, and is reflected at a high reflectance close to 100% by the reflecting surface 21r. The imaging light GL reflected by the first mirror member 21 is incident on the second mirror member 22, refracted by the refractive surface 22e, and reflected at a high reflectance close to 100% by the mirror surface 22r. The imaging light GL from the second mirror member 22 is incident on the third mirror member 23 and reflected at a reflectance of less than or equal to approximately 50% by the reflecting surface 23r. The imaging light GL reflected by the third mirror member 23 is incident on the exit pupil EP in which the pupil EY of the observer US is disposed. An intermediate image II is formed between the second mirror member 22 and the third mirror member 23. The intermediate image II is formed by appropriately enlarging an image formed on the display surface 11a of the display device 11. An angle of view observed in the position of the exit pupil EP is assumed to be about 48° diagonally.

The first mirror member 21 and the third mirror member 23 described above are not limited to surface mirrors, and may be rear surface mirrors including the mirror films 21c and 23c formed on rear surfaces of the plate-like bodies 21b and 23b.

According to the virtual image display apparatus 100 in the exemplary embodiment described above, the second mirror member 22 is the refractive reflective optical member 30 that includes the refracting surface 22e and the mirror surface 22r while the lens 40 is provided on the incidence side of the projection optical system 12. Thus, by making the lens surfaces 41 and 42 of the lens 40 and the refracting surface 22e of the second mirror member 22 have a function of correcting an aberration while being based on an eccentric mirror system including a plurality of mirrors, and resolution and the other optical performance can be enhanced over a wide angle of view. Further, since the lens 40 and the refractive reflective optical member 30 are integrated as the composite member 60, precision of positioning the lens 40 and the refractive reflective optical member 30 can be improved, and size reduction and improved reliability of the projection optical system 12 can be achieved by reducing the number of assembly components.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display apparatus 100 in the above-described exemplary embodiments, a self-luminous type display element such as an organic EL element is used as the display device 11. Instead, a configuration in which a laser scanner obtained by combining a laser light source and a scanner, such as a polygon mirror, may also be used as the display device 11.

The mirror surface 22r of the second mirror member 22 is not limited to the mirror surface 22r formed of the mirror layer 22c, and may be a total reflection surface that satisfies total reflection conditions. In this case, the mirror layer 22c is not needed, and vapor deposition using the mask MA is also not needed.

Not only the second mirror member 22 is used as the refractive reflective optical member 30, but also the first mirror member 21 may be used as the refractive reflective optical member 30.

A light control device that controls light by limiting transmitted light of the third mirror member 23 may be attached to the external side of the third mirror member 23. The light control device adjusts a transmittance, for example, electrically. Mirror liquid crystals, electronic shades, and the like may be used as the light control device. The light control device may adjust a transmittance according to external light brightness. When the light control device blocks the external light OL, only a virtual image that is not affected by an external image can be observed.

Figure 13:
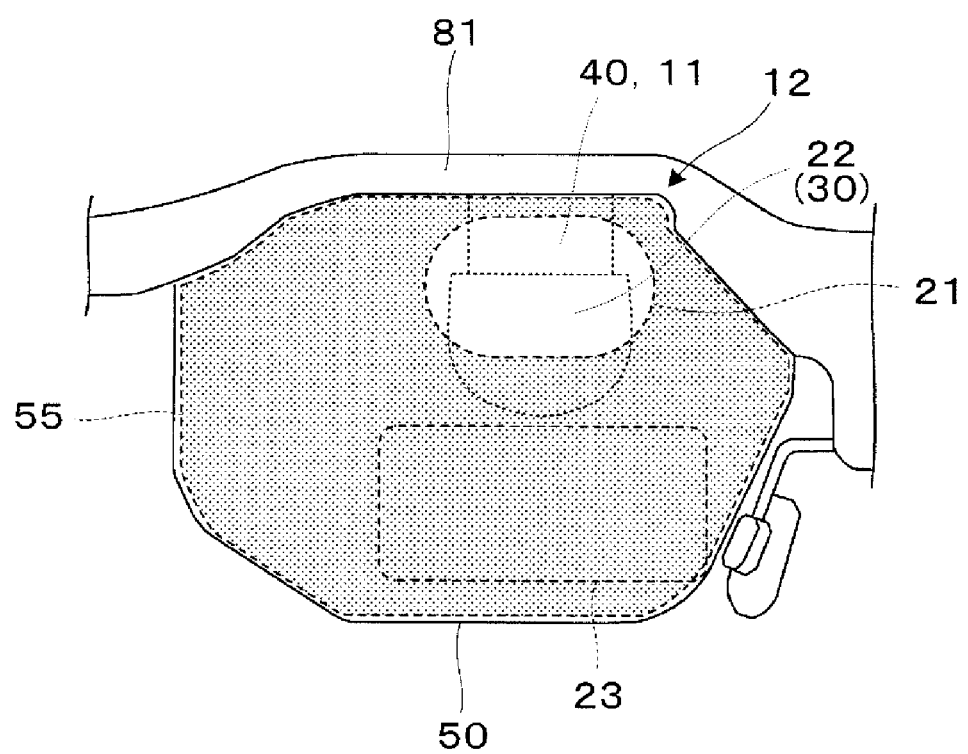
FIG. 13 is a front view illustrating a modified example of an appearance member.

In an apparatus exemplified in FIG. 13, a light control device 55 covers substantially the entire appearance member 50, but does not cover the external side of the first mirror member 21. On the other hand, the light control device 55 covers the external side and the periphery of the third mirror member 23. The light control device 55 can electrically adjust a transmittance and continuously change a transmittance in a range of from about 0% to about 100%. When a transmittance of the light control device 55 is substantially 0%, the light control device 55 is a VR type HMD of a so-called fully closed type, and becomes a see-through type when a transmittance is increased. In other words, an HMD of both types compatible with both of the closed and see-through types can be obtained by the control of the light control device 55, such as an electronic shade. Furthermore, even when the light control device 55 is used as an HMD of the see-through type, a dynamic range can be expanded for a displayed image by adjusting a transmittance of the light control device 55 according to external light brightness.

Further, the virtual image display apparatus of the claimed disclosure may also be compatible with a so-called see-through video product constituted by a virtual image display apparatus and an imaging device.

The mirror film 23c of the third mirror member 23 is not limited to the mirror film 23 having semi-transmissive property, and may be configured to reflect a specific polarization component, such as a wire grid element. The mirror film 23c of the third mirror member 23 may also be constituted by a volume hologram or the other hologram element, or may also be constituted by a diffraction grating.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

What is claimed is:

1. A virtual image display apparatus comprising:
an image forming unit configured to emit an imaging light;
a lens configured to refract the imaging light from the image forming unit;
a first mirror member configured to reflect the imaging light that passed through the lens, the first mirror member being a separate member from the lens;
a second mirror member including, across a refractive member, a refractive surface and a mirror surface that reflects the imaging light reflected by the first mirror member; and
a third mirror member of a transmissive type configured to reflect the imaging light reflected by the second mirror member toward a position of an exit pupil, wherein
the lens is disposed between the imaging forming unit and the first mirror member,
the lens and the second mirror member are integrated as a composite member, and
the second mirror member includes, as the refractive surface, an incidence surface and an emission surface configured independently of each other to transmit the imaging light before and after reflection by the mirror surface, or a common incidence-emission surface configured to transmit the imaging light before and after reflection by the mirror surface.

2. The virtual image display apparatus according to claim 1, wherein the lens has an incidence surface inclined with respect to an optical axis in a cross section including the optical axis in a first direction that corresponds to an eccentric direction defined by the first mirror member and the second mirror member.

3. The virtual image display apparatus according to claim 1, wherein each of a lens surface of the lens and the refractive surface of the second mirror member is an aspheric surface or a free curved surface.

4. The virtual image display apparatus according to claim 3, wherein the mirror surface of the second mirror member is an aspheric surface or a free curved surface.

5. The virtual image display apparatus according to claim 1, wherein the first mirror member and the third mirror member each are a mirror plate having a structure in which a mirror film is formed at one surface of a plate-like body.

6. The virtual image display apparatus according to claim 5, wherein a reflecting surface of each of the first mirror member and the third mirror member is an aspheric surface or a free curved surface.

7. The virtual image display apparatus according to claim 1, wherein the image forming unit displays a distorted modification image for correcting a distortion aberration by the lens, the first mirror member, the second mirror member, and the third mirror member.

8. The virtual image display apparatus according to claim 1, wherein the third mirror member covers a position of the exit pupil and has a shape concaved toward the exit pupil.

9. The virtual image display apparatus according to claim 1, wherein an optical axis passing through the first mirror member, the second mirror member, and the third mirror member is disposed along a plane extending in a substantially vertical direction intersecting a lateral direction in which a pair of pupils of an observer are aligned.

10. The virtual image display apparatus according to claim 9, wherein the first mirror member and the second mirror member are disposed at an upper side of the third mirror member to correspond to a head side of an observer.

11. The virtual image display apparatus according to claim 1, wherein the refractive member and the lens include a material having an Abbe number greater than or equal to 50.

12. The virtual image display apparatus according to claim 1, wherein a distance between the second mirror member and a position of the exit pupil is greater than or equal to 14 mm.

13. A virtual image apparatus comprising:
an image forming unit configured to emit an imaging light;
a composite member having a first portion and a second portion, the first portion configured to refract the imaging light, the second portion configured to refract the imaging light and reflect the imaging light;
a first mirror member configured to reflect the imaging light that passed through the first portion of the composite member to the second portion of the composite member, the mirror member being a separate member from the composite member;
a second mirror member being a refractive reflective optical member including, across a refractive member, a refractive surface and a mirror surface, and configured to reflect the imaging light reflected by the first mirror member; and
a transmissive type mirror member configured to reflect a part of the imaging light and transmit other part of the imaging light,
wherein
the first portion of the composite member is disposed between the imaging forming unit and the mirror member,
the second portion of the composite member refracts the imaging light incident from the mirror member and reflects the imaging light in which is incident toward the transmissive type mirror member, and
the second mirror member includes, as the refractive surface, an incidence surface and an emission surface configured independently of each other to transmit the imaging light before and after reflection by the mirror surface, or a common incidence-emission surface configured to transmit the imaging light before and after reflection by the mirror surface.

* * * * *